Oct. 27, 1925.
G. COOK
1,559,314
OPERATING MECHANISM FOR DIRIGIBLE HEADLIGHTS
Filed March 17, 1925
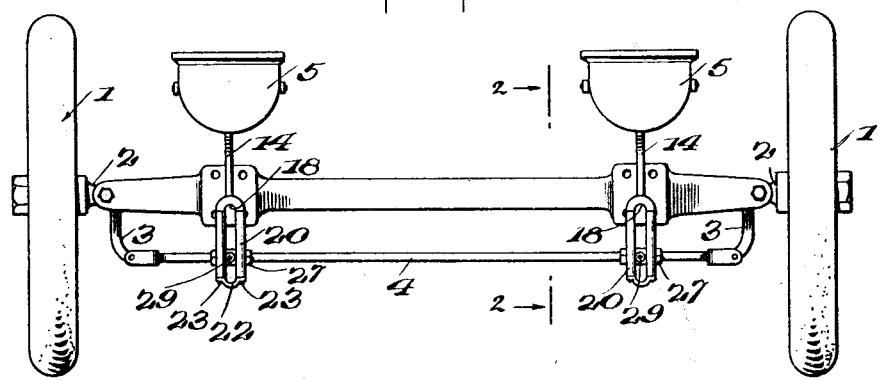
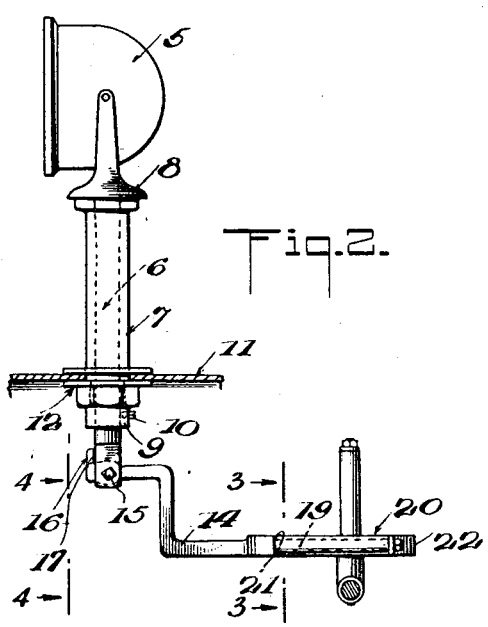
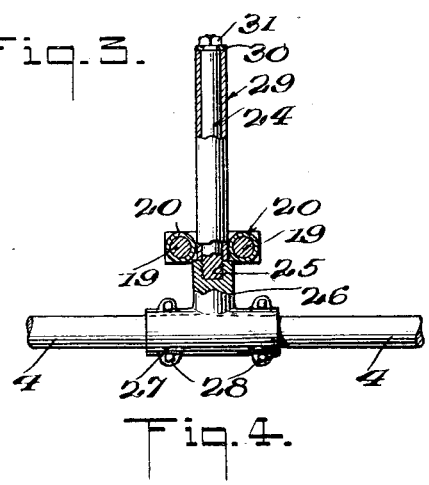
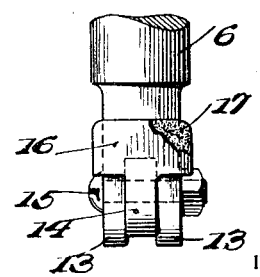
INVENTOR
Gustave Cook
BY
ATTORNEYS
WITNESSES Patented Oct. 27, 1925.

1,559,314

UNITED STATES PATENT OFFICE.

GUSTAVE COOK, OF GILLETT, WISCONSIN.

OPERATING MECHANISM FOR DIRIGIBLE HEADLIGHTS.

Application filed March 17, 1925. Serial No. 16,234.

*To all whom it may concern:*

Be it known that I, GUSTAVE COOK, a citizen of the United States, and a resident of Gillett, in the county of Oconto and State of Wisconsin, have invented certain new and useful Improvements in Operating Mechanism for Dirigible Headlights, of which the following is a specification.

My invention relates to improvements in operating mechanisms for dirigible headlights for vehicles, and it consists in the combinations, constructions and arrangements herein described and claimed.

An object of the invention is the provision of a practically frictionless reliable and efficient mechanism for transmitting motion from the usual cross connecting rod between the steering arms for the steering ground wheels of an automotive vehicle to the rotatable vertical headlight lamp supporting standards on the vehicle so that the lamp supporting standards and therefore the lamps thereon will be turned in unison with the steering ground wheels of the vehicle.

A further object of the invention is the provision of a mechanism of the character described which can be operatively applied to the cross connecting rod of an automobile or like vehicle of ordinary construction without any change from the usual construction of the cross connecting rod and without imposing any appreciable extra load or stress on the latter.

Other objects and advantages of the invention will be apparent from the following description, considered in conjunction with the accompanying drawings, in which Figure 1 is a plan view of the improved operating mechanism in applied position on a front wheel and connecting rod assembly of a vehicle.

Figure 2 is a section substantialy along the line 2—2 through the structure exhibited in Figure 1, showing also a fragmentary portion of a support for the bearing in which one of the lamp carying standards is journalled.

Figure 3 is a section along the line 3—3 of Figure 2, and

Figure 4 is a section along the line 4—4 of Figure 2.

In Figure 1, I show a pair of front or steering ground wheels 1 for an automobile. The wheels 1 are connected to turn in unison by the usual spindle arms 2 on which the wheels are mounted, the usual steering arms 3, and a cross connecting rod 4 which also may be of ordinary construction and which is pivotally attached at its opposite ends to the end portions of the respective steering arms 3. Axial movement of the connecting rod 4 to steer the wheels 1 may be effected in any suitable known manner, no means therefor being shown in the drawings.

Headlights 5 for the vehicle are carried at the upper end of vertical standards 6 which are journalled in tubular bearings 7, one of the headlight carrying standards and its bearing being shown in Figure 2. The standard 6 is prevented from moving axially in its bearing in any suitable known manner, as by having an enlarged head portion as at 8 supported, preferably anti-frictionally, on the upper end of the bearing 7 while a stop collar 9 is secured by a set screw 10 or like means to the standard 6 at the lower end of the tubular bearing 7. The latter may be secured to a stationary part of the vehicle by any suitable means, as for example to a portion 11 of a front fender of the vehicle by clamping means such as shown in Figure 2 and indicated generaly at 12.

Each standard 6 has a pair of integral spaced ears 13 at its lower end between which an end portion of a link 14 extends and to which the link 14 is pivotally attached by a horizontal pivot member 15 which extends through alined transverse openings in the ears 13 and an opening in the portion of the link 14 that is received between said ears. An upstanding stop lug 16 at the extremity of said one end portion of the link 14 has a facing 17 of rubber or like compressible resilient material adapted to contact with the standard 6 when the link 14 is substantially horizontal and to then prevent further downward swinging movement of the link 14 about the axes of the pivot element 15.

The other or rearward end portion of each link 14 is bifurcated by the slot 18, the furcations or branches 19 thereof being formed as substantially parallel horizontally spaced rods on which rollers 20 are rotatably supported. The rollers 20 are held against inward movement on the furcations 19 by shoulders 21 on the inner end portions of the furcations and against axial movement outward on the furcations by a retaining cap 22 which has attaching end portions secured to the ends of the furcations by cap bolts 23 or like fastening devices.

The inner wall of the cap 22 preferably is concavely curved in horizontal sectional contour as best seen in Figure 1.

The links 14 lie at a level slightly above that of the cross connecting rod 4. The latter is provided with an upstanding post 24 for each link 14. Each post 24 may have the lower end portion thereof secured in a vertical socket 25 in the upper end of a boss 26 which is upstanding from a clamp 27 which may comprise a pair of complementary longitudinal sections embracing the cross connecting rod 4 and secured firmly although removably to the latter by bolts and nuts indicated generally at 28 or like fastening devices. Each post 24 extends between the furcations 19 of the associated link 14 and is spaced from the rollers 20 on the latter by a roller 29 on said post. The roller 29 rests at its lower end on the upper end of the boss 26 and is prevented from moving upward on its supporting post 24 by a washer 30 and a nut 31 on the reduced upper end portion of said post.

From the foregoing description of the various parts of the device the operation thereof may be readily understood. Axial movement of the connecting rod will cause motion to be transmitted therefrom through the posts 24, rollers 29, rollers 20 and links 14 to the headlight supporting standards 6 so that such standards and therefore the headlights which are carried thereby will be turned in unison with the front or steering ground wheels of the vehicle. Very little, if any, friction will result from this transmission of motion between the cross connecting rod and the lamp carrying standards. The stop lugs 16 cooperate with the lamp standards to hold the links 14 substantially horizontal and above the level of the connecting rod 4 so that the weight of the links and of the parts which are supported thereon will not be imposed on the connecting rod. Moreover, the engagement of the upstanding stop lugs 16 with the standards 6 will tend to turn the latter about their axes when the connecting rod is moved axially without any strain on the pivot elements 15. The facing 17 on each stop lug 16 prevents noise which otherwise might be caused by slight relative movements of the lug 16 and the standard 6 with which it is associated.

Obviously the invention is susceptible of embodiment in forms other than that which is illustrated in the accompanying drawings and I therefore consider as my own all such modifications and adaptations thereof as fairly fall within the scope of the appended claim.

I claim:

A motion transmitting mechanism for connecting a cross connecting rod of the steering mechanism of an automobile with a rotatably supported vertical headlight standard, said mechanism comprising a link having a pair of substantially parallel furcations, a horizontal pivot element attaching one end portion of said link to the lower end portion of the standard, an upstanding stop lug on said one end portion of the link engaging with said standard to hold said link substantially horizontal, a clamp secured to said cross connecting rod, a vertical post carried by said clamp in position to extend between said furcations, a cap secured to the outer ends of said furcations in position to close the space between the outer ends of said furcations, a roller on each of said furcations, and a roller on said post in position to contact with the rollers on said furcations.

GUSTAVE COOK.